United States Patent Office 2,862,965
Patented Dec. 2, 1958

2,862,965

PHARMACEUTICAL COMPOUNDS

William A. Lott, Maplewood, and John Krapcho, New Brunswick, N. J., assignors to Olin Mathieson Chemical Corporation, New York, N. Y., a corporation of Virginia No Drawing. Application August 30, 1956
Serial No. 606,948

8 Claims. (Cl. 260—559)

This invention relates to new diphenylacetamide derivatives and, more particularly, to compounds of the general formula

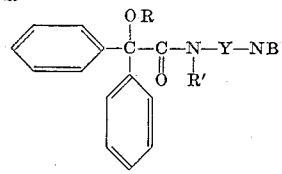

wherein R is a lower alkyl radical of less than four carbon atoms (i. e., methyl, ethyl, propyl and isopropyl), R' is lower alkyl (e. g., methyl ethyl, propyl, butyl and hexyl) or lower alkenyl (e. g., allyl, methallyl, 2-butenyl and 2-hexenyl); Y is a lower alkylene radical separating the nitrogen atoms by at least two carbon atoms and includes such radicals as ethylene, propylene, butylene and hexylene, whether branched or straight chained; and NB is dimethylamino, piperidino, pyrrolidino, morpholino, or $N^4$-methylpiperazino; and acid-addition salts thereof. The preferred compound is the one wherein R is ethyl, R' is methyl, Y is ethylene and NB is dimethylamino.

Examples of suitable acid-addition salts of the free base compounds of this invention include the mineral acid salts, such as the hydrohalides (e. g., hydrochloride, hydrobromide and hydroiodide), the sulfate, the phosphate, and the organic acid salts, such as the citrate, tartrate, oxalate, ascorbate and succinate. (Pharmacologically acceptable acids are, of course, employed where the salt form is prepared for therapeutic use.)

The compounds of this invention can be prepared by a variety of methods. One suitable method involves the reaction of α-halodiphenylacetyl halide (e. g., α-chlorodiphenylacetyl chloride) with an alkylene diamine of the formula HR'N—Y—NB to give the intermediate α-halodiphenylacetamide, which is then treated with an alkanol or alkoxide of the formula ROA, wherein R is as hereinbefore defined, and A is hydrogen or alkali metal, to yield the final product. A second method involves the reaction of N—(NB—Y)—N—R'-benzilamide (see U. S. Patent No. 2,733,256) with a chlorinating agent (e. g., phosphorus oxychloride or phosphorus pentachloride) and interacting the α-chlorobenzilamide, thus formed, with an alkanol or alkoxide of the formula ROA, wherein NB, Y, R, R' and A are as hereinbefore defined. Another method involves the reaction of the same N—(NB—Y)—N—R'-benzilamide with an alkali metal or agent furnishing the same (e. g., sodamide) to yield the corresponding salt and then treating the salt with a lower alkyl halide, RX, wherein X is halogen. A fourth alternative method involves the reaction of α-RO-diphenylacetyl halide (e. g., α-ethoxy-diphenylacetyl chloride) with an alkylene diamine of the formula

HR'N—Y—NB wherein NB, Y, R and R' are as hereinbefore defined. The free base or hydrochloric acid salt initially formed can then be converted to acid-addition salts by neutralization with the desired acid or metathesis with a salt of the desired acid, respectively.

The following examples illustrate the invention:

EXAMPLE 1

N-(2-dimethylaminoethyl)-2-ethoxy-N-methyl-2,2-diphenylacetamide hydrochloride (a) Preparation of N-(2-dimethylaminoethyl)-2-ethoxy-N-methyl-2,2-diphenylacetamide.—A solution of 265 g. of α-chlorodiphenylacetyl chloride [J. Chem. Soc., 64 (1947)] in 1.3 liters of benzene is stirred and treated dropwise with a solution of 102 g. of N,N,N-trimethylethylenediamine [Ann. Chim., 6, 835 (1951)] in 300 ml. of benzene while maintaining the reaction temperature at 20–25° C. The mixture is stirred at room temperature for two hours, refluxed for two hours and then subjected to distillation collecting about 1 liter of distillate during the dropwise addition of 500 ml. of absolute alcohol. The residue is treated with 1 liter of absolute alcohol and stirred with reflux for eleven hours. The mixture is concentrated to about 200 ml., cooled, dissolved in 500 ml. of water and treated with a solution of 60 g. of sodium hydroxide in 200 ml. of water. The liberated base is extracted with ether and dried over magnesium sulfate. The solution is filtered and the solvent evaporated to yield a residue which is fractionated to give a colorless distillate; B. P. about 160–162° C. at 0.2 mm.

(b) Preparation of N-(2-dimethylaminoethyl)-2-ethoxy-N-methyl-2,2-diphenylacetamide hydrochloride.— A solution of 170 g. of the base obtained in section (a) in 200 ml. of absolute alcohol is treated with one equivalent of hydrogen chloride in 100 ml. of absolute alcohol. The resulting solution is diluted with 600 ml. of ether to yield a crystalline solid melting at about 190–192° C. After recrystallization from isopropyl alcohol, the colorless product melts at about 190–192° C.

EXAMPLE 2

N-(2-dimethylaminoethyl)-2-methoxy-N-methyl-2,2-diphenylacetamide hydrochloride

A mixture of 29 g. of N-(2-dimethylaminoethyl)-N-methyl benzilamide hydrochloride and 18 g. of phosphorous pentachloride is stirred for five hours at room temperature. The mixture is treated with 20 ml. of carbon tetrachloride and stirred for two hours at room temperature. 18 ml. of phosphorous oxychloride is then added, and the mixture is stirred for 2 hours at room temperature, followed by heating at 60–70° C. for one and one-half hours. The solvent and excess phosphorous oxychloride are removed under reduced pressure, and the residue is suspended in 150 ml. of methanol and refluxed for ten hours. The major part of the solvent is distilled, the residue is dissolved in water and treated with excess potassium carbonate. The liberated base is extracted with chloroform and dried over magnesium sulfate. The product is purified by distillation to give about 20.0 g. of N-(2-dimethylaminoethyl)-2-methoxy-N-methyl-2,2-diphenylacetamide which is converted to the hydrochloride salt, as described in Example 1(b).

EXAMPLE 3

N-(morpholinoethyl)-2-ethoxy-N-methyl-2,2-diphenylacetamide hydrochloride

To 100 ml. of thionyl chloride is added portionwise 25.6 g. of ethoxydiphenylacetic acid, and the mixture is refluxed for four hours and the excess thionyl chloride removed under reduced pressure. The residue is dissolved in 200 ml. of benzene, stirred and treated dropwise with a solution of 14.4 g. of N-methyl-morpholinoethylamine in 50 ml. of benzene at room temperature. The mixture is refluxed for two hours, cooled, and the product filtered and dried.

Similarly, by substituting N⁴-methylpiperazine or pyrrolidine for the morpholine in the procedure of Example 3, the corresponding N⁴-methylpiperazino and pyrrolidino derivatives, respectively, are obtained.

EXAMPLE 4

*N - (2 - dimethylaminoethyl) - 2 - ethoxy - N - ethyl-2,2-diphenylacetamide hydrochloride*

Interaction of 29 g. of N,N-dimethyl-N'-ethylethylenediamine [Ann. Chim., 6, 835 (1951)] in 100 ml. of benzene with a solution of 66 g. of α-chlorodiphenylacetyl chloride in 250 ml. of benzene, followed by treatment with absolute ethanol according to the procedure described in Example 1(a), gives about 39 g. of the base; B. P. about 174–177° C. (0.6 mm.).

The hydrochloride salt of this material, after crystallization from isopropyl alcohol, melts at about 185–187° C.

EXAMPLE 5

*N - (2 - dimethylaminopropyl) - 2 - ethoxy - N - methyl-2,2-diphenylacetamide sulfate*

(a) *Preparation of N - (2 - dimethylaminopropyl)-2-ethoxy-N-methyl-2,2-diphenylacetamide.*—A solution of 265 g. of α-chlorodiphenylacetyl chloride in 1.3 liters of benzene is stirred and treated dropwise with a solution of 116 g. of N-methyl-2-dimethylaminopropylamine in 300 ml. of benzene while maintaining the reaction temperature at 20–25° C. The mixture is stirred at room temperature for two hours, refluxed for two hours, and then subjected to distillation collecting about 1 liter of distillate during the dropwise addition of 500 ml. of absolute alcohol. The residue is treated with 1 liter of absolute alcohol and stirred with reflux for eleven hours. The mixture is concentrated to about 200 ml., cooled, dissolved in 500 ml. of water, and treated with a solution of 60 g. of sodium hydroxide in 200 ml. of water. The liberated base is extracted with ether and dried over magnesium sulfate. The solution is filtered and the solvent evaporated to yield a residue which is fractionated to give a distillate of N-(2-dimethylaminopropyl)-2-ethoxy-N-methyl-2,2-diphenylacetamide.

(b) *Preparation of N - (2 - dimethylaminopropyl)-2-ethoxy-N-methyl-2,2-diphenylacetamide sulfate.*—A solution of 50 g. of the base obtained in section (a) in 200 ml. of absolute alcohol is treated with one equivalent of sulfuric acid in 100 ml. of absolute alcohol. The resulting solution is diluted with 600 ml. of ether to yield a crystalline solid.

EXAMPLE 6

*N - (2 - piperidinoethyl) - 2 - ethoxy - N - methyl-2,2-diphenylacetamide hydrochloride*

The reaction of 26.5 g. of α-chlorodiphenylacetyl chloride with 14.2 g. of 2-piperidinoethylmethylamine [J. Chem. Soc., 1421 (1935)] in benzene, followed by treatment with absolute alcohol, as described in Example 1(a), yields a colorless base which is then converted to a crystalline hydrochloride salt, by the procedure in Example 1(b).

EXAMPLE 7

*N-allyl-N-(2-dimethylaminoethyl)-2-ethoxy-2,2-diphenylacetamide hydrochloride*

(a) *Preparation of N-allyl-N',N'-dimethylethylenediamine.*—A solution of 171 g. of allylamine in 450 ml. of isopropyl alcohol is stirred and treated with 144 g. of 2-dimethylaminoethyl chloride hydrochloride followed by 120 g. of pulverized potassium carbonate. The mixture is stirred at room temperature for one hour and then refluxed for three hours, cooled and treated with a solution of 200 g. of sodium hydroxide in 400 ml. of water. The base is extracted with ether and dried over potassium carbonate. The mixture is filtered and the solvent distilled to yield a residue which is fractionated to give about 53 g. of colorless product; B. P. about 58–63° C. at 25 mm.

(b) *Preparation of N-allyl-N-(2-dimethylaminoethyl)-2-ethoxy-2,2-diphenylacetamide hydrochloride.*—A solution of 79.5 g. of α-chlorodiphenylacetyl chloride in 390 ml. of benzene is stirred and treated dropwise with a solution of 38.5 g. of N-allyl-N',N'-dimethylethylenediamine in 100 ml. of benzene. The mixture is refluxed and treated with absolute ethanol in the manner described in Example 1(a) to give about 76.5 g. of a colorless oil, B. P. about 170–175° C. (0.5 mm.). The hydrochloride salt, after crystallization from absolute alcohol, melts at about 208–210° C.

The compounds of this invention are useful as analgesics. Thus, N-(2-dimethylaminoethyl)-2-ethoxy-N-methyl-2,2-diphenylacetamide hydrochloride, for example, can be administered either perorally or intramuscularly in the same manner as meperidine hydrochloride for the alleviation of pain. The fact that the compounds of this invention display analgesic activity is surprising in view of the fact that the closely related 2-hydroxy derivatives [e. g., N-(2-dimethylaminoethyl)-2-hydroxy-N-methyl-2,2-diphenylacetamide hydrochloride] have virtually no analgesic activity.

The invention may be otherwise variously embodied within the scope of the appended claims.

We claim:

1. Compounds of the class consisting of: free bases having the general formula

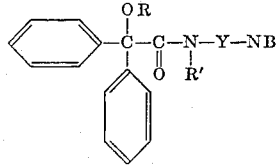

wherein R is a lower alkyl radical of less than four carbon atoms, R' is selected from the class consisting of lower alkyl and lower alkenyl, Y is a lower alkylene radical separating the nitrogen atoms by at least two carbon atoms, and NB is a radical selected from the class consisting of dimethylamino, piperidino, pyrrolidino, morpholino and N⁴-methylpiperazino; and the pharmacologically acceptable acid-addition salts thereof.

2. N - [dimethylamino(lower alkyl)] - 2 - ethoxy-N-(lower alkyl)-2,2-diphenylacetamide.

3. A pharmacologically acceptable acid-addition salt of a compound of claim 2.

4. N - (2 - dimethylaminoethyl) - 2 - ethoxy-N-methyl-2,2-diphenylacetamide.

5. A pharmacologically acceptable acid-addition salt of the compound of claim 4.

6. N-[dimethylamino(lower alkyl)]-2-ethoxy-N-allyl-2,2-diphenylacetamide.

7. A pharmacologically acceptable acid-addition salt of the compound of claim 6.

8. N - (2 - dimethylaminoethyl) - 2 - ethoxy-N-methyl-2,2-diphenylacetamide hydrochloride.

References Cited in the file of this patent

UNITED STATES PATENTS

| | | |
|---|---|---|
| 2,009,144 | Miescher et al. | July 23, 1935 |
| 2,733,256 | Krapcho et al. | Jan. 31, 1956 |

FOREIGN PATENTS

| | | |
|---|---|---|
| 438,659 | Great Britain | Apr. 25, 1935 |

OTHER REFERENCES

Ursillo et al.: Journal of Pharmacology and Experimental Therapeutics, vol. 114, pages 54–62 (1955).

Levine et al.: Journal of Pharmacology and Experimental Therapeutics, vol. 114, pages 63–77 (1955).

Karrer: Organic Chemistry (3rd edition) (1947), Elsevier Publishing Co. Inc., New York, page 50 relied on.